US 8,281,230 B2

(12) United States Patent
Erol et al.

(10) Patent No.: US 8,281,230 B2
(45) Date of Patent: *Oct. 2, 2012

(54) TECHNIQUES FOR STORING MULTIMEDIA INFORMATION WITH SOURCE DOCUMENTS

(75) Inventors: Berna Erol, Burlingame, CA (US);
Jonathan Hull, San Carlos, CA (US);
Dar-Shyang Lee, Union City, CA (US)

(73) Assignee: Ricoh Company, Ltd., Tokyo (JP)

( * ) Notice: Subject to any disclaimer, the term of this patent is extended or adjusted under 35 U.S.C. 154(b) by 1273 days.

This patent is subject to a terminal disclaimer.

(21) Appl. No.: 11/843,863

(22) Filed: Aug. 23, 2007

(65) Prior Publication Data

US 2007/0288523 A1 Dec. 13, 2007

Related U.S. Application Data

(63) Continuation of application No. 10/660,985, filed on Sep. 12, 2003, now Pat. No. 7,266,568.

(60) Provisional application No. 60/462,412, filed on Apr. 11, 2003.

(51) Int. Cl.
*G06F 17/00* (2006.01)
*G06F 17/30* (2006.01)

(52) U.S. Cl. ........ 715/200; 715/212; 715/732; 707/608; 707/913

(58) Field of Classification Search .................. 707/802, 707/608, 913; 715/200, 212, 732
See application file for complete search history.

(56) References Cited

U.S. PATENT DOCUMENTS

| | | | |
|---|---|---|---|
| 5,583,980 | A | 12/1996 | Anderson |
| 5,960,448 | A | 9/1999 | Reichek et al. |
| 5,974,372 | A | 10/1999 | Barnes et al. |
| 6,122,647 | A | 9/2000 | Horowitz et al. |
| 6,243,713 | B1 | 6/2001 | Nelson et al. |
| 6,370,498 | B1 | 4/2002 | Dabral et al. |
| 6,404,925 | B1 | 6/2002 | Foote et al. |
| 6,535,639 | B1 | 3/2003 | Uchihachi et al. |
| 6,560,637 | B1 | 5/2003 | Dunlap et al. |
| RE38,284 | E | 10/2003 | Allen et al. |
| 6,636,238 | B1 | 10/2003 | Amir et al. |
| 6,646,655 | B1 | 11/2003 | Brandt et al. |

(Continued)

FOREIGN PATENT DOCUMENTS

EP 0 459 793 A1 12/1991

(Continued)

OTHER PUBLICATIONS

Japanese Office Action for Application No. JP2004-114025, mailed on Feb. 9, 2010, 3 pages.

(Continued)

*Primary Examiner* — Cheryl Lewis
(74) *Attorney, Agent, or Firm* — Kilpatrick Townsend & Stockton LLP

(57) ABSTRACT

A method of storing information for recorded information and a source document is provided. The method comprises: determining a first piece of information included in the recorded information; determining at least a first source document from one or more source documents that comprises information that matches the first piece of information; and storing information identifying the recorded information, information representative of the first piece of information, and information identifying the first source document such that the information identifying the first source document can be determined given the information identifying the recorded information and the information representative of the first piece of information.

18 Claims, 9 Drawing Sheets

U.S. PATENT DOCUMENTS

| | | | |
|---|---|---|---|
| 6,701,014 | B1 | 3/2004 | Syeda-Mahmood |
| 6,732,915 | B1 | 5/2004 | Nelson et al. |
| 6,825,849 | B1 | 11/2004 | Minakuchi et al. |
| 6,839,059 | B1 | 1/2005 | Anderson et al. |
| 7,051,276 | B1 | 5/2006 | Mogilevsky et al. |
| 7,121,469 | B2 | 10/2006 | Dorai et al. |
| 7,206,773 | B2 | 4/2007 | Erol et al. |
| 7,236,632 | B2 | 6/2007 | Erol et al. |
| 7,248,782 | B2 | 7/2007 | Kasutani |
| 7,263,659 | B2 | 8/2007 | Hull et al. |
| 7,266,568 | B1 * | 9/2007 | Erol et al. ............................ 1/1 |
| 7,281,199 | B1 | 10/2007 | Nicol et al. |
| 7,394,938 | B2 | 7/2008 | Erol et al. |
| 7,616,840 | B2 | 11/2009 | Erol et al. |
| 7,643,705 | B1 | 1/2010 | Erol et al. |
| 7,664,733 | B2 | 2/2010 | Erol et al. |
| 7,698,646 | B2 | 4/2010 | Erol et al. |
| 2002/0034373 | A1 | 3/2002 | Morita et al. |
| 2002/0056082 | A1 | 5/2002 | Gage et al. |
| 2002/0120939 | A1 | 8/2002 | Wall et al. |
| 2002/0164151 | A1 | 11/2002 | Jasinschi et al. |
| 2002/0191013 | A1 | 12/2002 | Abrams |
| 2003/0009342 | A1 | 1/2003 | Haley |
| 2003/0011684 | A1 | 1/2003 | Narayanaswami et al. |
| 2003/0101043 | A1 | 5/2003 | Boegelund et al. |
| 2003/0169461 | A1 | 9/2003 | Gaebel et al. |
| 2003/0191633 | A1 | 10/2003 | Berger |
| 2004/0133845 | A1 | 7/2004 | Forstall et al. |
| 2004/0205041 | A1 | 10/2004 | Erol et al. |
| 2004/0205477 | A1 | 10/2004 | Lin |
| 2004/0205478 | A1 | 10/2004 | Lin et al. |
| 2004/0205601 | A1 | 10/2004 | Smith |
| 2005/0041872 | A1 | 2/2005 | Yim et al. |
| 2005/0084154 | A1 | 4/2005 | Li et al. |
| 2006/0002607 | A1 | 1/2006 | Boncyk et al. |
| 2006/0285772 | A1 | 12/2006 | Hull et al. |
| 2007/0127823 | A1 | 6/2007 | Seeber |
| 2007/0204229 | A1 | 8/2007 | Erol et al. |
| 2007/0288523 | A1 | 12/2007 | Erol et al. |

FOREIGN PATENT DOCUMENTS

| | | | |
|---|---|---|---|
| JP | 10-055391 | A | 2/1998 |
| JP | 11-272679 | | 10/1999 |
| JP | 2000-076306 | | 3/2000 |
| JP | 2000-112995 | | 4/2000 |
| JP | 2001-318919 | A | 11/2001 |
| JP | 2002-008052 | | 1/2002 |
| JP | 2002-207773 | A | 7/2002 |
| JP | 2002-304420 | | 10/2002 |
| JP | 2002-538536 | A | 11/2002 |
| JP | 2002-544596 | A | 12/2002 |
| JP | 2003-108976 | | 4/2003 |
| JP | 2004-302681 | | 10/2004 |
| WO | WO 99/50736 | A1 | 10/1999 |
| WO | WO 00/52596 | A2 | 9/2000 |

OTHER PUBLICATIONS

Ozawa, N., "Slide Identification in Lecture Video by Using Character Recognition," FIT2002, Forum on Information Technology, Information Technology Letters vol. 1, 133-134p.

Chiu et al., "LiteMinutes: an Internet-based system for multimedia meeting minutes," Proceedings of the 10th international conference on World Wide Web, May 2001, pp. 140-149, at URL: http://portal.acm.org/ft_gateway.cfm?id=371971&type=pdf&coll-ACM&di=ACM&CFID=52114454&CFTOKEN=66592544>.

Weber et al., "Live documents with contextual, data-driven information components," Proceedings of the 20th annual international conference on Computer documentation table of contents, Oct. 2000, pp. 236-247, at URL: http://portal.acm.org/ft_gateway.cfm?id=584990& type=pdf& coll= ACM&di=ACM&CFID=52114454&CFTOKEN=66592544>.

Notice of Allowance for U.S. Appl. No. 10/661,052, mailed Oct. 2, 2009, 24 pages.

Notice of Allowance for U.S. Appl. No. 10/696,735, mailed Aug. 17, 2009, 6 pages.

Supplemental Notice of Allowance for U.S. Appl. No. 10/696,735, mailed Sep. 3, 2009, 2 pages.

Interview Summary for U.S. Appl. No. 10/696,735, mailed Sep. 3, 2009, 3 pages.

Notice of Allowance for U.S. Appl. No. 12/350,900, mailed Sep. 18, 2009, 9 pages.

Final Office Action for U.S. Appl. No. 10/661,052, mailed Dec. 19, 2006, 19 pages.

Non-Final Office Action for U.S. Appl. No. 11/671,177, mailed Apr. 16, 2009, 18 pages.

Non-Final Office Action for U.S. Appl. No. 11/671,177, mailed Jun. 22, 2009, 19 pages.

U.S. Appl. No. 12/350,900, filed Jan. 8, 2009, Erol et al.

U.S. Appl. No. 10/696,735, filed Oct. 28, 2003, Erol et al.

Stricker et al., "Similarity of Color Images," pp. 1-12, SPIE 1995, San Jose.

Peng et al., "Document image template matching based on component block list," Pattern Recognition Letter 22, 2001, pp. 1033-1042, Elsevier Science B.V.

Non-Final Office Action for U.S. Appl. No. 10/660,985, mailed May 22, 2006, 10 pages.

Non-Final Office Action for U.S. Appl. No. 10/660,985, mailed Nov. 14, 2006, 8 pages.

Notice of Allowance for U.S. Appl. No. 10/660,985, mailed May 3, 2007, 15 pages.

Non-Final Office Action for U.S. Appl. No. 10/661,052, mailed Mar. 27, 2006, 13 pages.

Non-Final Office Action for U.S. Appl. No. 10/661,052, mailed Dec. 19, 2006, 19 pages.

Non-Final Office Action for U.S. Appl. No. 10/661,052, mailed Apr. 19, 2007, 23 pages.

Non-Final Office Action for U.S. Appl. No. 10/661,052, mailed Mar. 27, 2008, 23 pages.

Final Office Action for U.S. Appl. No. 10/661,052, mailed Oct. 28, 2008, 26 pages.

Non-Final Office Action for U.S. Appl. No. 10/661,052, mailed Mar. 3, 2009, 32 pages.

Non-Final Office Action for U.S. Appl. No. 10/660,867, mailed May 15, 2006, 11 pages.

Notice of Allowance for U.S. Appl. No. 10/660,867, mailed Nov. 1, 2006, 9 pages.

Notice of Allowance for U.S. Appl. No. 10/696,735, mailed Oct. 8, 2008, 15 pages.

Notice of Allowance for U.S. Appl. No. 12/350,900, mailed Jul. 13, 2009, 9 pages.

Non-Final Office Action for U.S. Appl. No. 11/617,177, mailed Apr. 16, 2009, 18 pages.

Non-Final Office Action for U.S. Appl. No. 11/617,177, mailed Jun. 22, 2009, 19 pages.

Requirement for Restriction/Election for U.S. Appl. No. 10/412,757, mailed Oct. 31, 2006, 4 pages.

Notice of Allowance for U.S. Appl. No. 10/412,757, mailed Feb. 27, 2007, 12 pages.

Non-Final Office Action for U.S. Appl. No. 11/749,606, mailed Dec. 12, 2007, 6 pages.

Notice of Allowance for U.S. Appl. No. 11/749,606, mailed Feb. 15, 2008, 6 pages.

Notice of Allowance for U.S. Appl. No. 11/749,606, mailed Mar. 10, 2008, 1 page.

Japanese Office Action for Application No. 2004/262653, mailed on Jul. 20, 2010, 3 pages.

Graham J., et al., "Video Paper: A Paper-Based Interface for Skimming and Watching Video", pp. 214-215 (Aug. 7, 2002), retrieved from Internet on Jan. 13, 2011: URL:http://ieeexplore.iee.org/apls/abs_all.jsp?arnumber=1013998.

Graham, J., et al., "A paper-based interface for video browsing nad retrieval", Processing of the 2003 International Conference on Multimedia and Expo: Jul. 6-9, 2003, Baltimore Marriot Waterfront Hotel, Baltimore, Maryland, USA, IEEE Operations Center, US, vol. 2, pp. 749-752, Jul. 6, 2003.

Hull, J.J., et al., "Visualizing multimedia content on paper documents: components of key frame selection for video paper", Document Analysis and Recognition, 2003. Proceedings. Seventh International Conference on Aug. 3-6, 2003. Piscataway, NJ, USA, IEEE, pp. 389-392, Aug. 3, 2003.

Summons to Attend Oral Proceedings Pursuant to Rule 115(1) EPC corresponding to related European Application No. 04020282.2 dated Mar. 3, 2011, 7 pages.

Brotherton et al., "Automated Capture, Integration, and Visualization of Multiple Media Streams," *Proceedings of IEEE Multimedia '98*, (1998).

Chiu et al., "Automatically Linking Multimedia Meeting Documents by Image Matching," *Proceedings of Hypertext '00*, ACM Press, pp. 244-245 (2000).

Chiu et al., "Room with a Rear View: Meeting Capture in a Multimedia Conference Room," *IEEE Multimedia magazine*, 7(4):48-54 (2000).

Franklin et al., "Jabberwocky: you don't have to be a rocket scientist to chang slides for a hydrogen combustion lecture," *Intelligent User Interfaces*, pp. 98-105 (2000).

Lee et al., "Portable Meeting Recorder," *ACM Multimedia Conference*, 2002.

Lienhart et al., "Localizing and Segmenting Text in Images, Videos and Web Pages," *IEEE Transactions on CSVT*, pp. 256-268 (2002).

Mukhopadhyay et al., "Passive capture and structuring of lectures," *ACM Multimedia*, pp. 477-487 (1999).

Muller et al., "The 'Authoring of the Fly' system for Automated Recording and Replay of (Tele)presentations," *ACM/Springer Multimedia Systems Journal*, vol. 8, No. 3 (2000).

Multi-university Research Laboratory, murl.microsoft.com; webpage printed Feb. 18, 2004.

Otsu, N., "A threshold selection method from gray-level histograms," *IEEE Transactions on Systems, Man and Cybernetics*, pp. 62-66 (1979).

Pimentel et al., "Linking by Interacting: a Paradigm for Authoring Hypertext," *Proceedings of ACM Hypertext '2000*, May 2000.

Scansoft Capture Development System, www.scansoft.com; webpage printed Feb. 18, 2004.

Stifelman, "The Audio Notebook: Paper and Plan Interaction with Structured Speech," Sep. 1997: Ph.D Thesis: Massachusetts Institute of Technology.

Stifelman, et al.; "The Audio Notebook: paper and pen interaction with structured speech," *Proc. of International Conf. on Human Factors in Computing Systems* Mar. 31-Apr. 5, 2001; pp. 182-189; CHI.

Transym OCR engine, http://www.transym.com/.

Trier et al., "Goal-Directed Evaluation of Binarization Methods," *IEEE Transactions on Pattern Analysis and Machine Intelligence*, pp. 1191-1201 (1995).

Waibel et al., "Advances in automatic meeting record creation and access," *Proceediings of ICASSP*, Seattle (2001).

Web page; "TELEform V7—Digitale Belegiesung, Automatische Datenerfassung aus Formularen;" Form-Solutions; at URL=http://www.form-solutions.net/dl/Teleform.pdf>; printed Feb. 10, 2005; 5 pages.

Web page; "Xerox Office Software Suite FlowPort Version 2.1.1;" *Capture and Distribution*; at URL=http://www.xrce.xerox.com/showroom/pdf/flowport.pdf>; printed Feb. 10, 2005; 4 pages.

WebEx Presentation Studio, presenter.com

Won et al.; "Efficient Use of MPEG-7 Edge Histogram Descriptor;" *ETRI Journal;* Feb. 2002; pp. 23-30; vol. 24; No. 1.

\* cited by examiner

To be included in k.ppt:
```
<SOURCE>
        <INDEX>
                <SELFINDEX>
                        <INDEXTYPE>SLIDE</INDEXTYPE>
                        <BEGIN>3</BEGIN>
                </SELFINDEX>
                <REFINDEXGROUP>
                        <REFINDEX>
                                <SOURCE> http:/....../video.rm</SOURCE>
                                <INDEXTYPE>TIME-RANGE</INDEXTYPE>
                                <BEGIN>00:05:00</BEGIN>
                                <END>00:09:05</END>
                        </REFINDEX>
                        <REFINDEX>
                                <SOURCE> http:/....../video.rm</SOURCE>
                                <INDEXTYPE>TIME-RANGE</INDEXTYPE>
                                <BEGIN>00:19:00</BEGIN>
                                <END>00:20:35</END>
                        </REFINDEX>
                </REFINDEXGROUP>
        </INDEX>
</SOURCE>
```

To be included in m.ppt:
```
<SOURCE>
        <INDEX>
                <SELFINDEX>
                        <INDEXTYPE>SLIDE-RANGE</INDEXTYPE>
<BEGIN>4</BEGIN>
<END>7</END>
</SELFINDEX>
                <REFINDEXGROUP>
                        <REFINDEX>
                                <SOURCE>d:\img.jpg</SOURCE>
                                <INDEXTYPE>WHOLEDOC </INDEXTYPE>
</REFINDEX>
</REFINDEXGROUP>
        </INDEX>
        <INDEX>
                <SELFINDEX>
                        <INDEXTYPE>TIME-RANGE</INDEXTYPE>
<BEGIN>10:00</BEGIN>
<END>12:10</END>
</SELFINDEX>
                <REFINDEXGROUP>
                        <REFINDEX>
                                <SOURCE>http:/....../audio.wav</SOURCE>
                                <INDEXTYPE>BYTES</INDEXTYPE>
<BEGIN>14300</BEGIN>
</REFINDEX>
</REFINDEXGROUP>
        </INDEX>
</SOURCE>
```

*Fig. 11*

TECHNIQUES FOR STORING MULTIMEDIA INFORMATION WITH SOURCE DOCUMENTS

CROSS-REFERENCES TO RELATED APPLICATIONS

The present application is a continuation of U.S. patent application Ser. No. 10/660,985, U.S. Pat. No. 7,266,568, filed Sep. 12, 2003, entitled "Techniques for Storing Multimedia Information with Source Documents," which claims priority from U.S. Provisional Application No. 60/462,412, filed Apr. 11, 2003, each of which are herein incorporated by reference for all purposes.

The present application incorporates by reference for all purposes the entire contents of the following:

U.S. application Ser. No. 10/412,757, now U.S. Pat. No. 7,236,632, filed Apr. 11, 2003;

U.S. application Ser. No. 10/661,052, U.S. Pat. No. 7,664,733, filed concurrently with the present application;

U.S. application Ser. No. 10/660,867, now issued U.S. Pat. No. 7,206,773, filed concurrently with the present application; and U.S. application Ser. No. 10/001,895, now issued U.S. Pat. No. 7,263,659, filed Nov. 19, 2001.

BACKGROUND OF THE INVENTION

The present invention generally relates to techniques for associating recorded information with a source document and more particularly to techniques for determining association information for a piece of the recorded information and information in the source document.

Presentations are typically given using one or more presentation slides. Slides from a source document, e.g., a Powerpoint™ (PPT) document, may be output during a presentation. The information captured or recorded during a presentation may include image information, including images of slides presented during the presentation, audio information captured during the presentation, video information captured during the presentation, and other types of information. The captured or recorded information may be stored in a multimedia document. Multimedia documents may be considered as compound objects that comprise video, audio, closed-caption text, keyframes, presentation slides, whiteboard capture information, as well as other multimedia type objects. Examples of multimedia documents include documents storing interactive web pages, television broadcasts, videos, presentations, text documents, or the like.

If a user is interested in a previously given presentation, the user is typically limited to reviewing hard copies of the presentation slides that were used. In this case, the user cannot listen to the explanations and discussions that were given for each slide. In other cases, the presentation may be recorded in audio, video, or any combination thereof. The user can then watch the audio/video recording from start to finish while referencing the hard copy of the presentation slides. The user may view the audio/video recording of the entire presentation but really would like to refresh their memory for only certain parts of the presentation.

Often, given hardcopies of slides, a user would like to find portions of information captured during a presentation related to one or more slides of the source document. Presently, the user is limited to visually and manually searching through the audio/video recording for the presentation to identify portions of the presentation that correspond to slides that may be of interest to the user. The above method includes many disadvantages. For example, time is wasted searching for the corresponding audio/video sections. Also, a user may become frustrated at the process of searching for corresponding audio/video sections and stop searching.

BRIEF SUMMARY OF THE INVENTION

Embodiments of the present invention relate to techniques for determining association information for recorded information and source documents.

In one embodiment, a method of storing information for recorded information and a source document is provided. The method comprises: determining a first piece of information included in the recorded information; determining at least a first source document from one or more source documents that comprises information that matches the first piece of information; and storing information identifying the recorded information, information representative of the first piece of information, and information identifying the first source document such that the information identifying the first source document can be determined given the information identifying the recorded information and the information representative of the first piece of information.

In another embodiment, a method of storing information for recorded information and a source document is provided. The method comprises: determining information identifying a first piece of information from a source document; determining at least a first recorded information that comprises information that matches the first piece of information; determining one or more portions of the first recorded information comprising information that is associated with the a first recorded information; and storing information identifying the source document, information representative of the first piece of information, information identifying the first recorded information, and information identifying the one or more portions of the first recorded information such that the information identifying the first recorded information and the information identifying the one or more portions of the first recorded information can be determined given the information identifying the source document and the information representative of the first piece of information.

In yet another embodiment, a structure that stores information for one or more portions in a source document and recorded information is provided. The structure comprises: source document information identifying a source document; one or more source identifiers identifying the one or more portions of the source document; and information identifying one or more portions of the recorded information for each source identifier of the one or more source identifiers, wherein the one or more source identifiers and the source document information can be determined given the information identifying the one or more portions of the recorded information.

In another embodiment, a structure including information that links one or more portions in a source document with one or more sections of multimedia information is provided. The structure comprises: source document information identifying a source document; a recorded information identifier identifying the recorded information; and information identifying one or more portions of the recorded information for recorded information identifier, wherein the source document information can be determined given the information identifying the recorded information identifier and the one or more portions of the recorded information.

A further understanding of the nature and the advantages of the inventions disclosed herein may be realized by reference of the remaining portions of the specification and the attached drawings.

BRIEF DESCRIPTION OF THE DRAWINGS

FIG. 11 illustrates an embodiment of an XML table that can be used in accordance with one embodiment of the present invention.

DETAILED DESCRIPTION OF THE INVENTION

Figure 1:
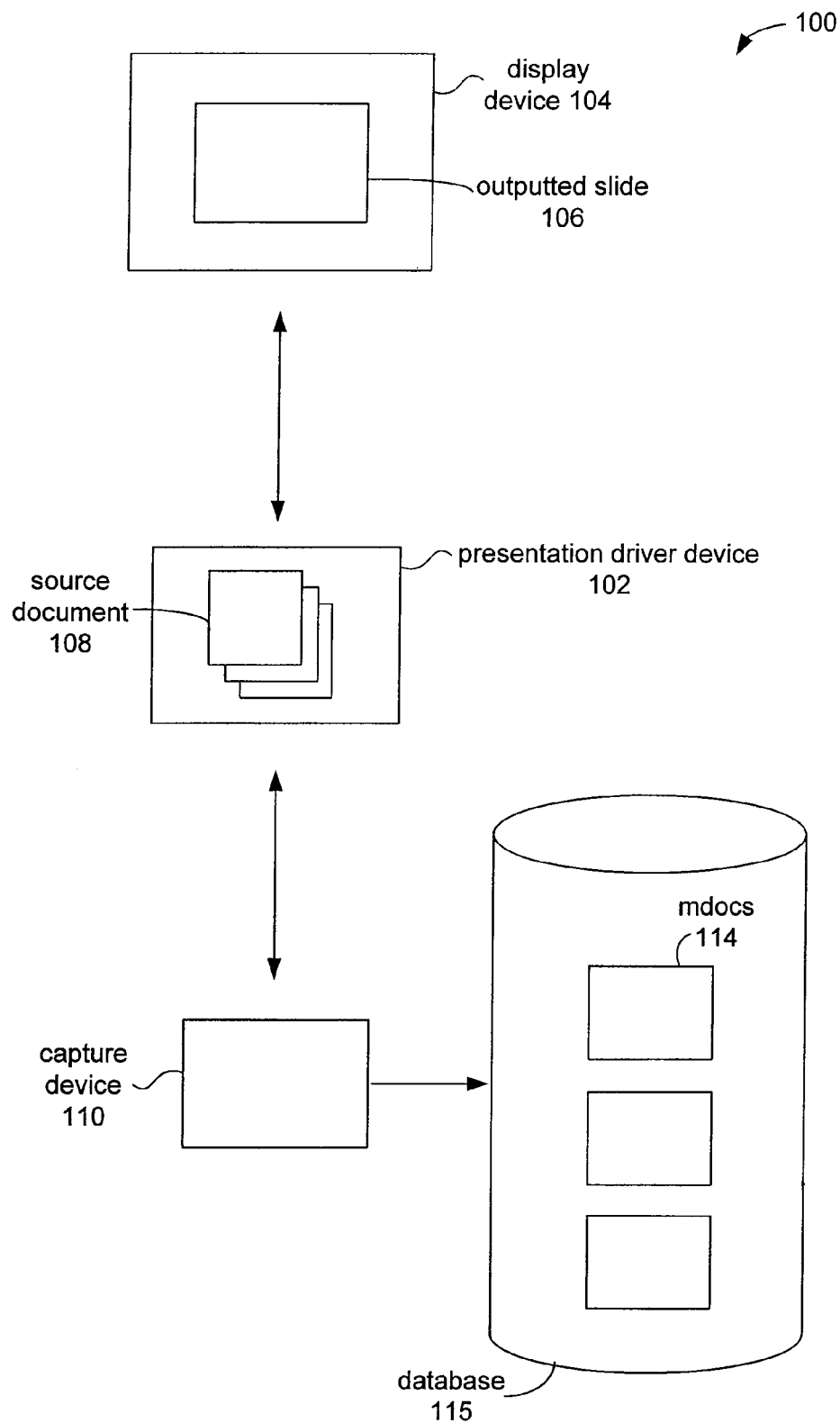
FIG. 1 depicts a simplified block diagram of a system for capturing information according to one embodiment of the present invention.

FIG. 1 depicts a simplified block diagram 100 of a system for capturing information according to one embodiment of the present invention. It will be apparent that system 100 as depicted in FIG. 1 is merely illustrative of an embodiment incorporating the present invention and does not limit the scope of the invention as recited in the claims. One of ordinary skill in the art will recognize other variations, modifications, and alternatives.

A presentation driver device 102 and a display device 104 are used to output slides and other information that may be stored in a source document 108 or a symbolic presentation file. For example, slides from a Powerpoint™ (PPT) presentation may be output and displayed on display device 104. In one embodiment, the term "source document" as used in this application is intended to refer to any document stored in electronic form. For example, a document that is created using an application program and whose contents or portions thereof may be a source document. Also, source documents may be scanned documents, a pdf version of a document, an image of a document, etc. The contents of source document 108 may include slides, images, text information, etc. A source document may comprise one or more portions. For example, a PPT document may comprise one or more pages. Each page of a PPT document may comprise one or more slides. The portions of source document 108 will be referred to as slides for discussion purposes but it will be understood that a slide may also be one or more images, one or more pages of a document, etc. Source document 108 may be created using one or more application programs. For example, a PPT document may be created using an application program, such as Microsoft's Powerpoint™. Source document 108 is an electronic document that may be manipulated and edited using the application program that created it, or any other program.

In one embodiment, source document 108 is different than a captured image of a slide, which has not been created by an application program and is often not directly editable by the application program. For example, a PPT document comprising one or more slides created using a Powerpoint™ application program can be easily edited by the Powerpoint™ application. In contrast, a joint photographics group (JPEG) image of the displayed slide is not created by the Powerpoint™ application but is recorded information. Although a PPT document may contain JPEG images, the JPEG images are included in a slide created by a PPT application.

When a slide of source document 108 is displayed on display device 104, it is referred to as an outputted slide 106. For example, outputted slide 106 is a slide or image from source document 108 that has been outputted and displayed.

While a presenter is giving a presentation, the presenter may display slides from source document 108 on display device 104. While a slide is being displayed on display device 104, the presenter will then often describe or explain the contents of the displayed slide. For example, the presenter may embellish on the text or images displayed in mdoc 106. Attendees of the presentation may also comment on the displayed slide (e.g., ask questions about the slide, etc.). The information output during a presentation, including information output by display device 104, by the presenter, by attendees of the presentation, or any information captured during the presentation may be captured or recorded using one or more capture devices 110. Examples of presentations include lectures, meetings, speeches, conferences, classes, demonstrations, etc.

Information recorded or captured during a presentation may include text information, graphics information, animation information, sound (audio) information, video information, slides information, whiteboard images information, and other types of information. For example, a video recording of presentation may comprise video information and/or audio information. In certain instances the video recording may also comprise close-captioned (CC) text information which comprises material related to the video information, and in many cases, is an exact representation of the speech contained in the audio portions of the video recording. Recorded information is also used to refer to information comprising one or more objects wherein the objects include information of different types. For example, objects included in recorded information may comprise text information, graphics information, animation information, sound (audio) information, video information, slides information, whiteboard images information, and other types of information.

In one embodiment, the recorded information may be stored in a multimedia document 114 in a database 115. Alternatively, the recorded information may be processed in real-time as it is captured. The term "multimedia document" as used in this application is intended to refer to any electronic storage unit (e.g., a file, a directory, etc.) that stores recorded information. Various different formats may be used to store the recorded information. These include various MPEG formats (e.g., MPEG 1, MPEG 2, MPEG 4, MPEG 7, etc.), MP3 format, SMIL format, HTML+TIME format, WMF (Windows Media Format), RM (Real Media) format, Quicktime format, Shockwave format, various streaming media formats, formats being developed by the engineering community, proprietary and customary formats, and others. Examples of multimedia documents 114 include video recordings, MPEG files, news broadcast recordings, presentation recordings, recorded meetings, classroom lecture recordings, broadcast television programs, papers, or the like.

Capture device 110 is used to capture any recorded information. A single capture device may capture different types of information (e.g., a video recorder can capture both audio and video information) or a single type of information (e.g., a microphone may capture only audio information. Information may be captured using various types of capture devices such as screen capture devices 110, such as a screen capture device, a digital camera, camera, cellular phone with a camera, video recorder, audio recorder, and the like. For certain capture devices 110, such as digital cameras, cell phones with the ability to capture pictures, etc., other information related to the outputted slide may also be stored along with the captured information. Information related to the user that captured the information may also be stored.

As mentioned above, as the presentation is being given, recorded information is captured by capture device 110. For example, the recorded information may be audio and visual information of the presentation. Also, the recorded information may include captured images of the outputted slides. The information is then stored in database 115 as mdoc 114.

Temporal information may be stored for the recorded information. For example, temporal information may be stored for the captured audio and video information. If the recorded information includes images, temporal information may also be stored for the captured images. For example, the temporal information for a slide image may indicate a time when the slide was displayed by display device 104. The temporal information may be used to synchronize the various types of information included in the recorded information. For example, the temporal information may be used to synchronize audio information and video information at a time that corresponds to when outputted slides were displayed.

In one example, a slide from source document 108 was displayed from a time T1 to T2. Information from a time T1 to T2 is recorded. For example, an image of the displayed slide may be recorded and stored in mdoc 114. Also, audio information and video information from those times are recorded and stored in mdoc 114. The captured audio and video information may be associated with the captured image and the times T1 and T2. This indicates that the audio and video information was captured at the recorded times while the captured image was being displayed. Although a range of times is stored, it should be understood that other temporal information may also be stored. For example, the time when a slide is first displayed may be stored. In this case, the range that a slide was displayed will be from the start time of slide to the start time of the next displayed slide.

According to an embodiment of the present invention, the stored temporal information is used to associate recorded information or portions thereof to a source document 108 or a portion of the source document, as will be described below.

Figure 2:
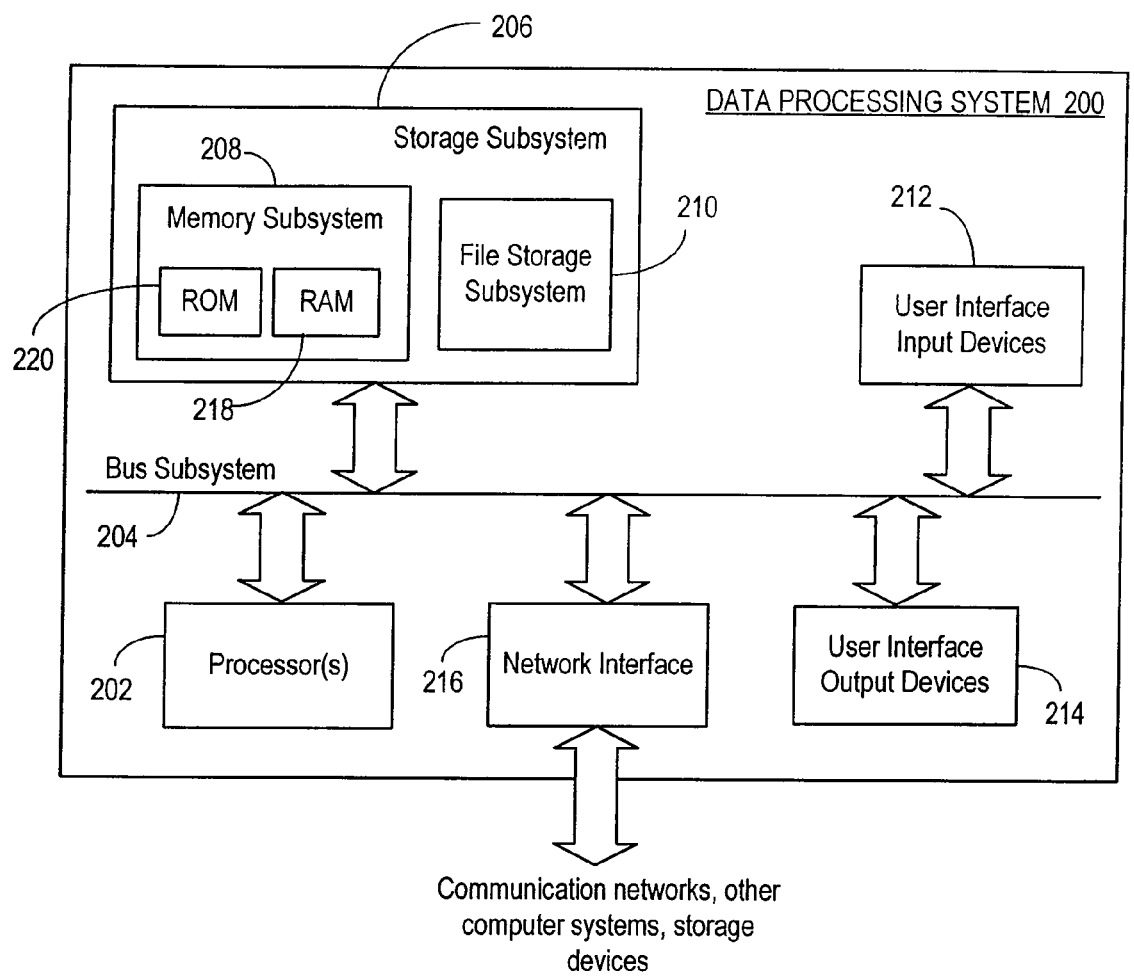
FIG. 2 is a simplified block diagram of a data processing system that may incorporate an embodiment of the present invention.

FIG. 2 is a simplified block diagram of a data processing system 200 that may incorporate an embodiment of the present invention. As shown in FIG. 2, data processing system 200 includes at least one processor 202, which communicates with a number of peripheral devices via a bus subsystem 204. These peripheral devices may include a storage subsystem 206, comprising a memory subsystem 208 and a file storage subsystem 210, user interface input devices 212, user interface output devices 214, and a network interface subsystem 216. The input and output devices allow user interaction with data processing system 202.

Network interface subsystem 216 provides an interface to other computer systems, networks, and storage resources 204. The networks may include the Internet, a local area network (LAN), a wide area network (WAN), a wireless network, an intranet, a private network, a public network, a switched network, or any other suitable communication network. Network interface subsystem 216 serves as an interface for receiving data from other sources and for transmitting data to other sources from data processing system 200. For example, may receive the images to be compared via network interface subsystem 216. Embodiments of network interface subsystem 216 include an Ethernet card, a modem (telephone, satellite, cable, ISDN, etc.), (asynchronous) digital subscriber line (DSL) units, and the like.

User interface input devices 212 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information to data processing system 200.

User interface output devices 214 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from data processing system 200.

Storage subsystem 206 may be configured to store the basic programming and data constructs that provide the functionality of the present invention. For example, according to an embodiment of the present invention, software modules implementing the functionality of the present invention may be stored in storage subsystem 206. These software modules may be executed by processor(s) 202. Storage subsystem 206 may also provide a repository for storing data used in accordance with the present invention. For example, the images to be compared including the input image and the set of candidate images may be stored in storage subsystem 206. Storage subsystem 206 may comprise memory subsystem 208 and file/disk storage subsystem 210.

Memory subsystem 208 may include a number of memories including a main random access memory (RAM) 218 for storage of instructions and data during program execution and a read only memory (ROM) 220 in which fixed instructions are stored. File storage subsystem 210 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 204 provides a mechanism for letting the various components and subsystems of data processing system 202 communicate with each other as intended. Although bus subsystem 204 is shown schematically as a single bus, alternative embodiments of the bus subsystem may utilize multiple busses.

Data processing system 200 can be of varying types including a personal computer, a portable computer, a workstation, a network computer, a mainframe, a kiosk, or any other data processing system. Due to the ever-changing nature of computers and networks, the description of data processing system 200 depicted in FIG. 2 is intended only as a specific example for purposes of illustrating the preferred embodiment of the computer system. Many other configurations having more or fewer components than the system depicted in FIG. 2 are possible.

Figure 3:
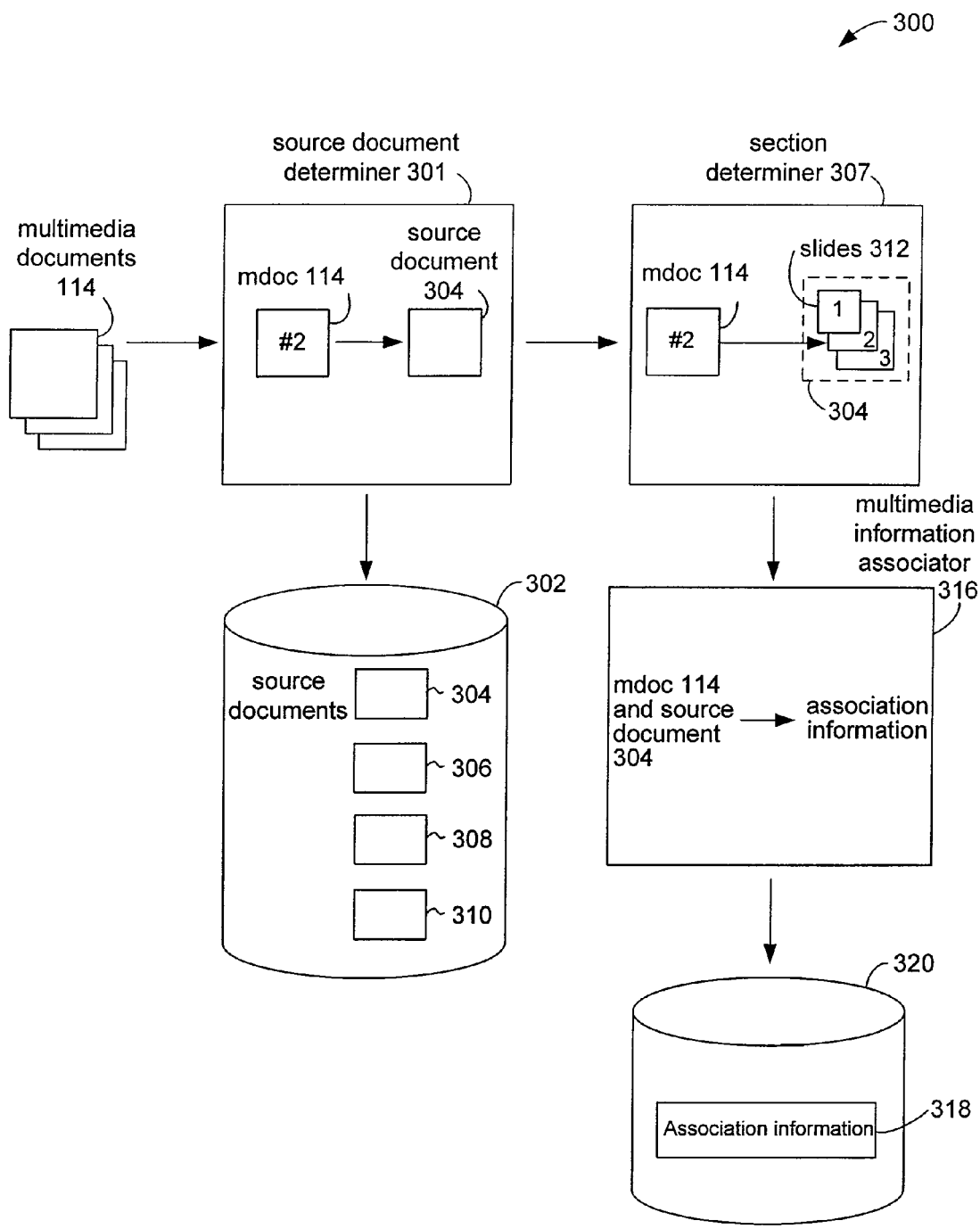
FIG. 3 depicts a system to determine source documents and portions of source documents that comprise images included in the information stored by multimedia document according to one embodiment of the present invention.

FIG. 3 depicts a system 300 to determine source documents 108 and portions of source documents 108 that comprise images included in the information stored by multimedia document 114 according to one embodiment of the present invention. It will be apparent that system 300 as depicted in FIG. 3 is merely illustrative of an embodiment incorporating the present invention and does not limit the scope of the invention as recited in the claims. One of ordinary skill in the art will recognize other variations, modifications, and alternatives.

As shown, a multimedia document 114 is input to a source document determiner 301. In one embodiment, mdocs 114 stores recorded information. For example, multimedia document 114 may store images of slides, or a portion of the image may include a slide (i.e., the image may also comprise other information such as the picture of the presenter, etc.). Also, any other content may be input, such as text, audio, video, etc. A slide may also be present in a keyframe extracted from the recorded information. Mdocs 114 may store images of slides # 1-N, but for discussion purposes, system 200 will be described as processing a first portion of multimedia document 114 referred to as an image #2. Although an image #2 is used, it should be understood that any content may be input. For example, text, audio, video, etc. may be input and matched to portions of source documents. It should be understood that the following techniques may be used for other portions of mdoc 114.

Source document determiner (sdd) 301 determines one or more source documents from a plurality of source documents accessible to sdd 301 that comprise at least one image included in the information stored by the input multimedia document 114. For example, source document determiner 301 determines if image #2 can be matched to a portion of one or more source documents 304, 306, 308, and 310 included in a database 302. Each source document in database 302 may include information that corresponds to image #2. For example, a source document may include content such as one or more images, slides, text information, audio information, etc. that corresponds to image #2. If image #2 includes images of slides that were displayed for a source document, the image in image #2 may be matched with a slide in any of source documents 304, 306, 308, and/or 310. For discussion purposes, source document 304 is determined to include a slide present in the information stored by multimedia document 114. It should be understood that other source documents (e.g., source documents 306, 308, and/or 310) may include slides that match portions found in mdoc 114 and the following process could also be applied to the other source documents.

Section determiner 307 receives information from source document determiner 301 identifying one or more source documents that that comprise at least one slide included in the information stored by the input multimedia document 114. For each source document from the one or more source documents, section determiner 307 determines one or more portions of the source document that comprise a slide included in multimedia document 114. Section determiner 307 matches image #2 with one or more portions (referred to as slides 312) of source document 304. For example, image #2 may include information that corresponds to a slide #2 in slides #1-3 in source document 304. Thus, image #2 may contain an image of slide #2 in slides 312. In one embodiment, while slide #2 was being displayed, an image of slide #2 was captured as information in multimedia document 114. As will be described below, various techniques may be used to match portions of mdoc 114 to any number of slides in slides 312.

Multimedia information associator (mia) 316 receives information from section determiner 307 indicating the determined slide of source document 304. Multimedia information associator 316 then determines association information for image #2 of mdoc 114 and slide #2 of source document 304. For source document 304, mia 316 determines the identity of source document 304 (e.g., filename of the source document, a portion of source document 304 (e.g., the page on which the slide is present), and a location where source document 304 is stored (e.g., directory path name). For multimedia document 114, mia 316 determines information on how multimedia document 114 can be accessed (e.g., the directory or storage device identifier where multimedia document 114 is stored), when the portions of multimedia document 114 associated with an image is present (portions are identified using temporal information e.g., a starting time T1 and an end time T2). For a particular multimedia document 114, multiple portions of multimedia document 114 may comprise the slide.)

Figure 4A:
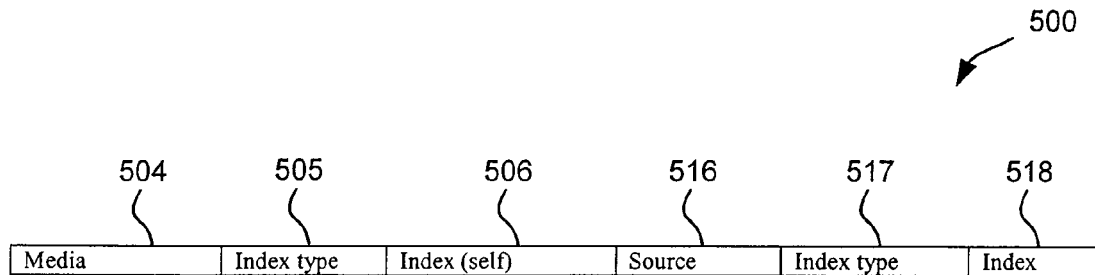
FIGS. 4A and 4B illustrate embodiments of tables that may be used to associate portions of mdoc and portions of source document.
Figure 4B:
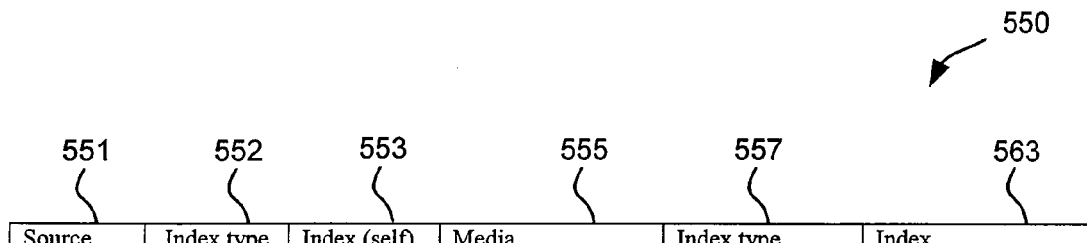

The above information is then stored in a table in database 320. FIG. 4A shows a table 500 where information is stored for each multimedia document (i.e., the first column identifying the multimedia document is the primary key for the table). FIG. 4B shows a table where information 550 is stored for each source document (i.e., the first column identifying the multimedia document is the primary key for the table). Mia 316 may store information for table 500 and/or table 550.

In one example, recorded information from the times T1 to T2 is associated with the image in mdoc 114. For example, the recorded information (e.g., audio/video information) may have been captured while the image was being displayed in a presentation. Recorded information from the times T1 to T2 is then associated with the determined one or more slides. Thus, recorded information that was captured while an image in mdoc 114 was being displayed is associated with a slide in source document 108 that includes information in the image of mdoc 114. Accordingly, using the image in mdoc 114, recorded information can be associated with a slide in source document 108 that includes information in the image of mdoc 114. Information for the association is then stored in database 320.

In one embodiment, table 500 includes association information that may allow a user to specify (or select) a slide in a source document and access corresponding information in mdoc 114. For example, information from a time T2 to T3 may be selected and a slide #2 in source 304 is accessed and displayed. For example, table 500 may have pre-determined images in source document 304 that correspond to temporal information for the image #2 of mdoc 114 from the times T2 to T3. Using a location of source document 304, an image in source document 304 is accessed and displayed when information from the times T2 and T3 is selected.

In another embodiment, table 550 includes association information that may allow a user to specify (or select) a portion of mdoc 114 and access corresponding information in a source document. For example, slide #2 may be selected and recorded information from mdoc 114 is accessed and displayed. For example, table 550 may have pre-determined temporal information for the image #2 of mdoc 114 from the times T2 to T3. Using a location of mdoc 114, information from the times T2 and T3 are accessed and played.

FIGS. 4A and 4B illustrate embodiments of tables that may be used to associate portions of mdoc 114 and portions of source document 108. It will be apparent that tables 500 and 550 as depicted in FIGS. 4A and 4B are merely illustrative of embodiments incorporating the present invention and do not limit the scope of the invention as recited in the claims. One of ordinary skill in the art will recognize other variations, modifications, and alternatives.

Referring to FIG. 4A, table 500 identifies information in mdoc 114 and information for slides in source document 108. In table 500, for each multimedia document 114 identified in a column 504, information is stored identifying one or more source documents 108 whose contents include at least one slide included in the contents of multimedia document 114.

Each row of column 504 stores information 502 identifying a multimedia document 114. A row identifies a multimedia document identifier that includes or references information. The multimedia document identifier may be a filename storing recorded information, a directory location or one or more files storing the recorded information, etc. In one embodiment, the identifier is a uniform resource locator (URL) that can be used to access recorded information, a reference to a storage location, an ID that identifies and makes the link to a non-electronic medium (e.g., paper), etc. An example describing a system that uses an ID that identifies and makes the link to a non-electronic medium is described in U.S. application Ser. No. 10/001,895, filed Nov. 19, 2001, which is incorporated by reference in its entirety for all purposes.

A column 505 identifies an index type for the recorded information identified in column 504. The index type can be a number, a page number, time, range, section, line numbers, layer, etc. Although the index type is explicitly stated in column 505, the index type may be interpreted based on the recoded information identified in column 504. For example, it may be determined that a video is being referenced and the index type is a time.

Each row of a column 506 stores information identifying an index for each identifier in column 504. The index may be a range or a single pointer. For example, the index may be a temporal identifier for a portion of recorded information. Also, the index may be a pointer to a single time, one or more page numbers, etc. For example, the index may be "00:01:10-00:02:10", "00:09:00", "5" or "5-10". In one embodiment, each index is a start time for recorded information stored at an identifier in column 504. As shown, a first portion of recorded information starts at a time T=00:00:00 and has no duration A second portion of recorded information is found in a byte range of "123344-167722". The third and fourth portions of recorded information are found at a page number "1" and a layer "4".

Each portion of recorded information is also associated with a portion of source document 108. Column 516 includes source document identifiers that identify a location of a source document 108. As shown, the location "D:\k.ppt" identifies a source document 108 that is associated with recorded information in the same row. The same is true for the other rows of column 516. It will also be understood that a row in column 516 may be associated with multiple portions of recorded information in column 504.

Each row in a column 518 includes the reference to a portion of each source document 108 identified in column 516. For example, an index #3 (e.g., a slide #3) in source document 108 found at "D:\k.ppt" corresponds to temporal identifier 508. An index #1 (e.g., a slide #1) in source document 108 found at "D:\m.ppt" corresponds to temporal identifier 510 and an index #2 in the same source document 108 corresponds to temporal identifiers 512 and 514.

A column 517 identifies an index type for the source document 108 identified in column 516. The index type can be a number, a page number, time, range, section, line numbers, layer, etc. Although the index type is explicitly stated in column 517, the index type may be interpreted based on the source document 108 identified in column 516. For example, it may be determined that a PPT document is being referenced and the index type is a slide number or range.

The above table may be stored with or linked to a recorded information stream found at the URL "http:/ . . . /video.rm". Thus, when the stream is accessed at certain index points, table 500 is used to determine the corresponding portions of source document 108. The portion may then be accessed, retrieved, and/or displayed.

In FIG. 4b, table 550 identifies information in mdoc 114 and information for slides in source document 108. In table 550, for each source document 108 identified in column 551, information is stored identifying one or more mdocs 114 whose contents include at least one slide included in the contents of source document 108.

Each row of column 551 stores information identifying a source document 108. Each row identifies a source document identifier that includes or references information. The source document identifier may be a filename storing source document 108, a directory location of one or more files storing source document 108, etc. In one embodiment, the identifier is a storage location that can be used to access source document 108. Although an identifier for source document 108 is shown in each row, it will be understood that multiple rows may be associated with a single identifier.

A column 552 identifies an index type for the source document 108 identified in column 551. The index type can be a number, a page number, time, range, section, line numbers, layer, etc. Although the index type is explicitly stated in column 552, the index type may be interpreted based on the source document 108 identified in column 551. For example, it may be determined that a PPT document is being referenced and the index type is a slide number or range.

Each row of a column 553 includes information for a portion of source document 108. For example, a portion identifier references a page, slide number, etc. in a file located at an identifier in column 551.

Each row of a column 555 stores mdoc identifiers identifying a portion of mdoc 114. Each identifier references recorded information at a location, such the URL "http:/ . . . / video.rm". In one embodiment, the URL references video content in a file "video.rm".

A column 557 identifies an index type for the recorded information identified in column 555. The index type can be a number, a page number, time, range, section, line numbers, layer, etc. Although the index type is explicitly stated in column 557, the index type may be interpreted based on the recoded information identified in column 555. For example, it may be determined that a video is being referenced and the index type is a time.

Information in a column 563 indicates which portions of an mdoc identifier correspond to information found at source identifier. For example, the video content at "http:/ . . . /video.rm" from the times T=00:05:00 to T=00:09:05 is associated with a source identifier at "D:\k.ppt". Also, video content at "http:/ . . . /video.rm" from the range "00:19:00-00:20:35" is associated with a portion of source document 108 at "D:\k.ppt", the whole document at "http:/ . . . /im.jpg" is associated with a portion of source document at "D:/m.ppt", and a bit at "http:/ . . . /audio.wav" at "14300" is associated with a portion of source document 108 at "D:\m.ppt"

The above table 550 may be stored with or linked to source documents 108 found at the locations "D:\k.ppt" and "D:\m.ppt". Thus, when portions of source document 108 are accessed at certain index points, table 550 is used to determine the corresponding portions of mdoc 114. The portion may then be accessed, retrieved, and/or displayed.

Accordingly, information may be selected in a source document 108 and corresponding recorded information in mdoc 114 may be accessed. For example, a slide in a presentation that was shown is selected and the video/audio information of the presenter describing the displayed slide is accessed.

In one embodiment, the input may be a source document 108, comprising one or more slides, and multimedia documents and/or portions of multimedia documents for each slide in the source document are determined. For example, for a given source document, source document determiner (sdd) 301 determines one or more multimedia documents, from a plurality of multimedia documents 114, that store at least one slide image from the source document. Section determiner 307 determines one or more portions for mdocs 114 that include the at least one slide image. Mia 316 then associates recorded information associated with the one or more portions of mdocs 114 with the at least one slide image. Information is then stored for the at least one slide and recorded information as described above.

In one embodiment, process of determining association information may be done manually. Also, whether the association information was determined automatically or manually, the association information may be modified.

Figure 5:
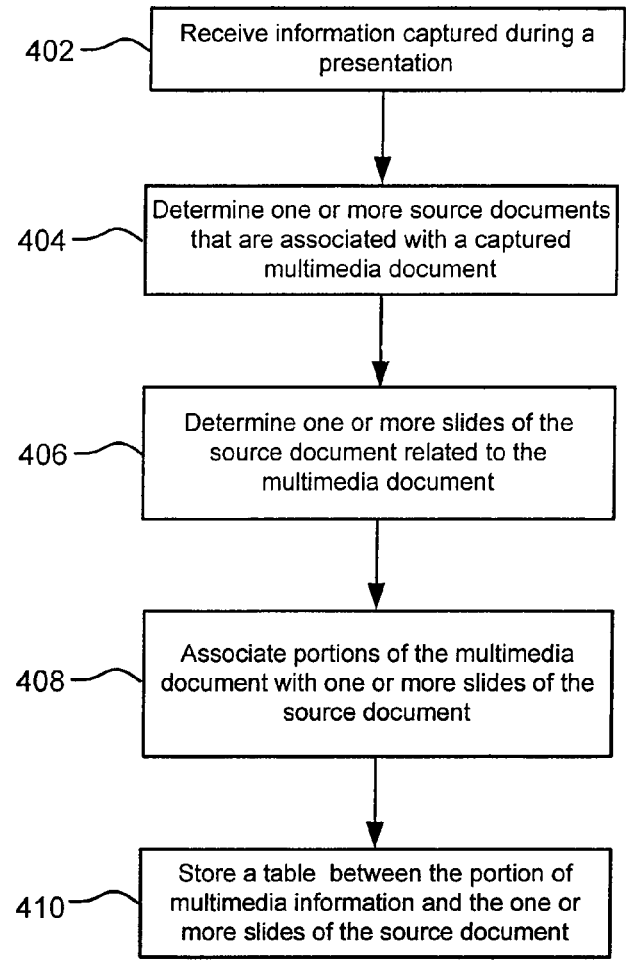
FIG. 5 depicts a simplified flow chart of a method for associating recorded information with source document according to one embodiment the present invention.

FIG. 5 depicts a simplified flow chart 400 of a method for associating recorded information with source document 108 according to one embodiment the present invention. The method depicted in FIG. 5 is merely illustrative of an embodiment incorporating the present invention and does not limit the scope of the invention as recited in the claims. One of ordinary skill in the art would recognize other variations, modifications, and alternatives.

In step 402, information captured during a presentation is received. The information received in step 402 may have been captured during a presentation. The information may include information of various types, e.g., audio information, video information, images, etc., and may be stored in a multimedia document 114. For example, a presentation is given by a presenter. As the presentation is given, images are displayed from source document 108. For example, slides are displayed while a presenter provides explanation and additional information about the displayed slides. The recorded information may include audio information, video information, or any other information for the presentation. Step 402 corresponds to functions performed by section document determiner 301 in FIG. 2.

In step 404, one or more source documents 108 that are associated with a multimedia document 114 are determined. For example, there may be many source documents 108 in a database. The method determines which source documents 108 include a slide that matches information in multimedia document 114. A source document 108 is considered to be associated with information in multimedia document 114 if source document 108 comprises at least one image that is included in the multimedia document 114.

Once one or more source documents 108 are identified, in step 406, one or more portions of source document 108 that contain the information in mdoc 114 are determined. Step 406 corresponds to functions performed by section determiner 307 in FIG. 2.

In one example, an image in mdoc 114 may correspond to a slide #1 in a source document 108. The slides of source document 108 that are related to an image in mdoc 114 may be determined by many methods that will be described below.

In step 408, portions of mdoc 114 are then associated with the corresponding one or more slides of source document 108. In one example, recorded information from the times T1 to T2 has been associated with the image in mdoc 114. For example, the recorded information (e.g., audio/video information) may have been captured while the image was being displayed in a presentation. Recorded information from the times T1 to T2 is then associated with the determined one or more slides in source document 108. Thus, recorded information that was captured while an image in mdoc 114 was being displayed is associated with a slide in source document 108 that includes information in the image of mdoc 114. Accordingly, using the image in mdoc 114, recorded information can be associated with a slide in source document 108 that includes information in the image of mdoc 114. Step 408 corresponds to functions performed by mia 316 in FIG. 2.

In one embodiment, in steps 406 and 408, the input may be a source document 108, comprising one or more slides, and multimedia documents and/or portions of multimedia documents for each slide in the source document are determined. For example, for a given source document, source document determiner (sdd) 301 determines one or more multimedia documents, from a plurality of multimedia documents 114, that store at least one slide image from the source document. Section determiner 307 determines one or more portions for mdocs 114 that include the at least one slide image. Mia 316 then associates recorded information associated with the one or more portions of mdocs 114 with the at least one slide image. Information is then stored for the at least one slide and recorded information as described above.

In step 410, a table is stored between the associated portions of mdoc 114 and the one or more slides of source document 108. In one embodiment, association in the table may be stored in an XML table that links the slides of source document 108 to the portions of multimedia information 112. Alternatively, the table may associate portions of mdoc 114 with the one or more slides of source document 108. FIG. 11 illustrates an embodiment of an XML table corresponding to table 550 of FIG. 4b. The association allows a user to select either a portion of recorded information or one or more slides of source document 108 and be provided with the corresponding one or more slides of source document 108 or portions of recorded information. Thus, recorded information captured during the presentation may be accessed using the original (e.g., an electronic copy) source document 108 or the original source document 108 may be used to access the recorded information. Also, it should be understood that other information, such as portions of a paper may be linked to source document 108.

In one embodiment, the recorded information and source document 108 may be stored together. The recorded information may be embedded into source document 108 or vice versa. The table may be stored with both the recorded information and source document 108, or separately. In the case of a Powerpoint™ file, for example, the recorded information (or the association information) is stored in source document 108 as a PPT object. The association between the slide number and the recorded information is stored in a PPT format.

If recorded information is included in source document 108 (or vice versa), a self contained document formed that allows either the recorded information or information in source document 108 to be accessed using the self-contained document. This makes it easier to share, publish, e-mail, and edit information in the recorded information or source document 108. Even if the recorded information and source document 108 are included in a self contained document, they can be separated. For example, when a user is editing the PPT file with a video file attached to it, the user can extract the video file and share it with others.

Although the processing depicted in FIG. 5 was described for one portion of an mdoc 114, it will be understood that the processing may be repeated for multiple source documents 108. Also, if source documents are inputted instead of mdocs 114, the process may be repeated for multiple of mdocs 114.

Figure 6:
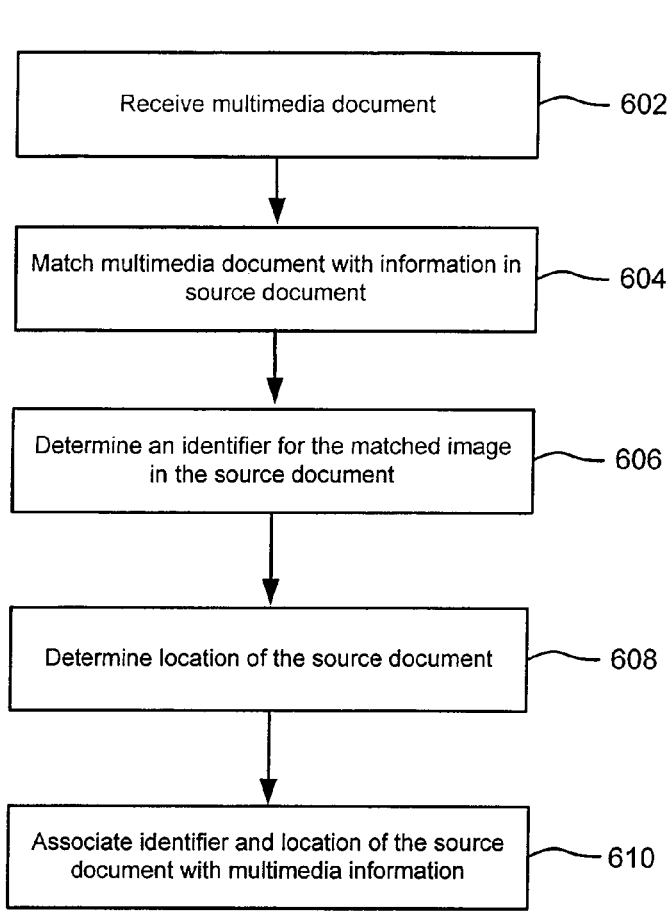
FIG. 6 depicts a simplified flow chart of a method for determining slides of a source document that correspond to information in an mdoc according to one embodiment of the present invention.
Figure 7:
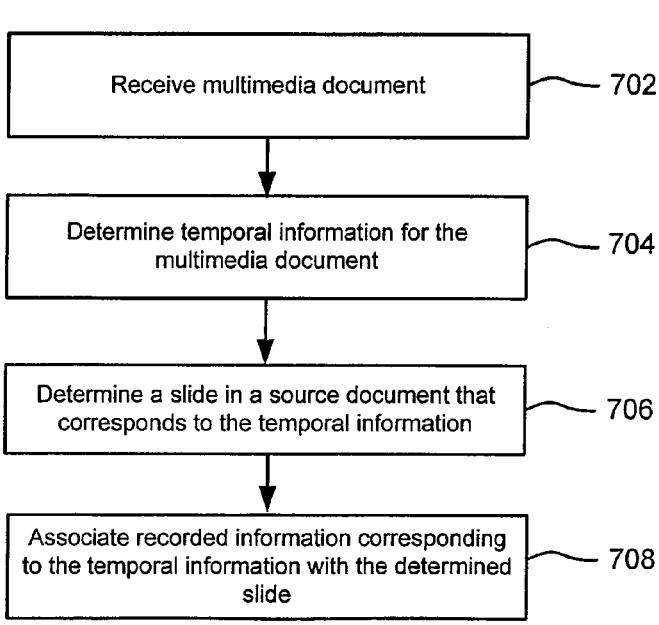
FIG. 7 depicts a simplified flow chart of a method for using temporal information to determine a portion of a source document according to one embodiment of present invention.

FIGS. 6 and 7 depict embodiments of determining step 406 and associating step 408 of FIG. 4. The methods depicted in FIGS. 6 and 7 are merely illustrative of embodiments incorporating the present invention and do not limit the scope of the invention as recited in the claims. One of ordinary skill in the art would recognize other variations, modifications, and alternatives.

FIG. 6 depicts a simplified flow chart 600 of a method for determining slides of a source document 108 that correspond to information in an mdoc 114 according to one embodiment of the present invention. The method is described using image #2 and source document 304 of FIG. 3. Although the method is describes as matching images, it should be understood that any content may be matched. For example, content such as text, audio, video, etc. may be matched. In step 602, an image #2 is determined. Although the process will be described for only one mdoc 114, it should be understood that multiple mdocs 114 may be processed as follows.

In step 604, image #2 is matched with information in source document 304. For example, the information may be an image. In one embodiment, image matching techniques disclosed in U.S. patent application Ser. No. 10/412,757, filed on Apr. 11, 2003 entitled "Automated Techniques for Comparing Contents of Images" may be used and is hereby incorporated by reference for all purposes. An input image is matched to a set of potential candidate images. The set of candidate images may be the slides in the source document 304. For each multimedia document 114, individual images that are included in the information stored by the multimedia document 114 and contain slides are used as an input image. The individual images may be determined from analyzing keyframes extracted from video information, from images included in the recorded information stored by multimedia document 114, slide information, etc. The time range for each slide image may also be determined (i.e., the information shown in the fourth column of the table in FIG. 4B.

In step 606, an identifier for the matched slide in source document 302 is determined. For example, the identifier may be a slide number or page number. The identifier is used as an index into source document 302.

In step 608, a location where source document 302 can be accessed is determined. For example, the location may be a file name, URL, storage location, etc.

In step 610, information related to the identifier and location of source document 302 and the portion of multimedia document 114 including the slide are stored such that an association is formed where recorded information in mdoc 114 is associated with the identifier and location of source document 302. For example, recorded information from the times T2 to T3 is associated with the identifier of source document 302.

FIG. 7 depicts a simplified flow chart 700 of a method for using temporal information to determine a portion of a source document according to one embodiment of present invention. The method will be described using image #2 and source document 304 of FIG. 3.

In step 702, image #2 is received. In step 704, temporal information associated with image #2 is determined. The temporal information may be time stamps associated with a portion of multimedia document 114. For example, a time stamp may have been associated with a captured image when a picture was taken or a slide was captured.

In step 706, a slide in source document 302 that corresponds to the temporal information is determined. For example, the times that slides in source document 302 were displayed may correspond to times associated with recorded information If the temporal information indicates a time stamp, then the corresponding slide in source document 302 that was displayed at that time is determined. This can be determined using time stamps determined by a presenter. The time stamps may be expected durations for times that slides will be displayed. If a presentation is started at a certain time, the expected durations can be used to association recorded information with slides in source document 108. Also, times that slides in source document 108 are displayed may be recorded and stored. These times are used to associated recorded information with slides in source document 108.

Once the temporal information and slide in source document 302 are known, a range of times for the recorded information may be determined. If the temporal information indicates that the slide was displayed from the times between T2 and T3 and a time stamp is in between the times T2 and T3, that slide is determined.

In step 708, recorded information corresponding to the temporal information is then associated with the determined slide of source document 304. For example, recorded information from the times T2 to T3 is associated with slide # 2.

Figure 8:
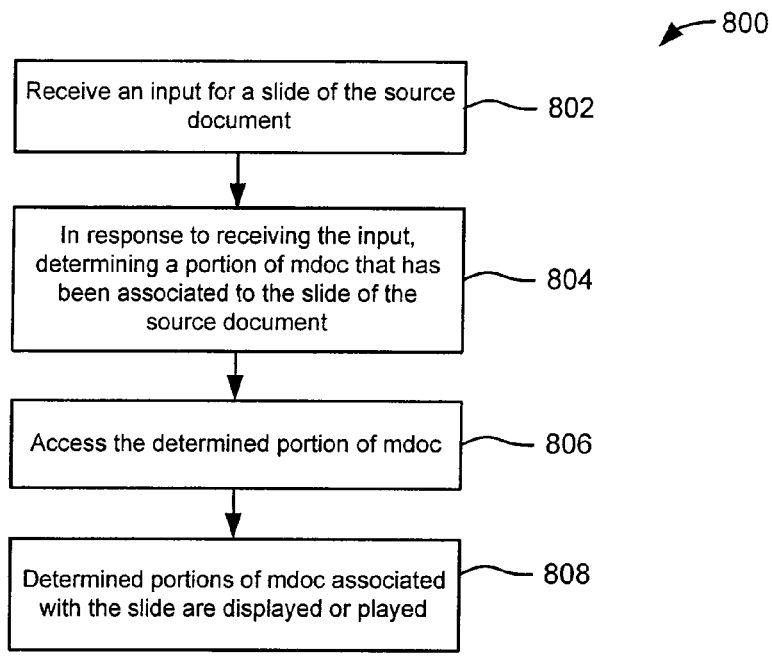
FIG. 8 depicts a simplified flow chart of a method for accessing portions of an mdoc using portions of source document.

Once information in mdocs 114 and source documents have been associated, they can be used to access each other. The following describes techniques for accessing portions of mdocs 114 and source documents 108. FIG. 8 depicts a simplified flow chart 800 of a method for accessing portions of mdoc 114 using portions of source document 108. The method depicted in FIG. 8 is merely illustrative of an embodiment incorporating the present invention and does not limit the scope of the invention as recited in the claims. One of ordinary skill in the art would recognize other variations, modifications, and alternatives.

In step 802, an input is received identifying a slide from a source document 108. The information identifies a source document 108 and index information (e.g., a slide identifier). The input may be received as a selection of a slide from an icon on a screen, an input of a slide identifier such as a page or slide number or the index number that has been stored in table 318.

In step 804, in response to receiving the input, a portion of mdoc 114 is determined. Based upon the received information, a table (such as table 550 depicted in FIG. 5B) can be searched to determine if the slide was shown during a captured presentation. In searching table 550 it is determined if column 551 of table 550 contains an entry that matches the information identifying the source document. If such an entry is found, search the rows in column 553 associated with the entry to determine an entry matches the particular slide received in step 802. If such an entry exists, then multimedia documents 114 corresponding to that entry and identified in column 555 are the multimedia documents that contain that particular slide. Column 563 of table 550 identifies the portions (time ranges) of multimedia documents 114. The identified portions may be recorded information.

In step 806, the determined portions of mdoc 114 in step 804 are accessed. For example, table 550 may cause the recorded information associated with the identifiers 556, 558, and 560 to be retrieved at the locations indicated by the identifiers. For example, video, images, and text are retrieved for recorded information at the locations shown.

In step 808, the determined portions of mdoc 114 associated with the slide are displayed, played, etc. In one embodiment, the portions may not be played right away but an icon or any other device that may trigger the playing of portions are displayed on a screen. When the icon is selected, the portions will be played. For example, when input is received for the slide, corresponding video information associated with identifier 556 is played in one window. The video may be a video of a person giving the presentation and may also include audio of any explanations or discussions about the slide. Also, a JPEG image associated with identifier 558 of a captured slide might be displayed in a second window and text associated with identifier 560 may be displayed in a third window. The text may be a transcription of audio information for the explanation recorded during the presentation, video paper, or the like. Various different techniques using one or more output devices may be used to output the information.

Accordingly, input was received for a slide in a source document, and corresponding portions of an mdoc 114 (e.g., recorded information) associated with the slide was automatically accessed for a user. The corresponding recorded information may then be played or displayed. Thus, users interested in a slide in a presentation may easily view recorded information that is associated with the slide.

Figure 9:
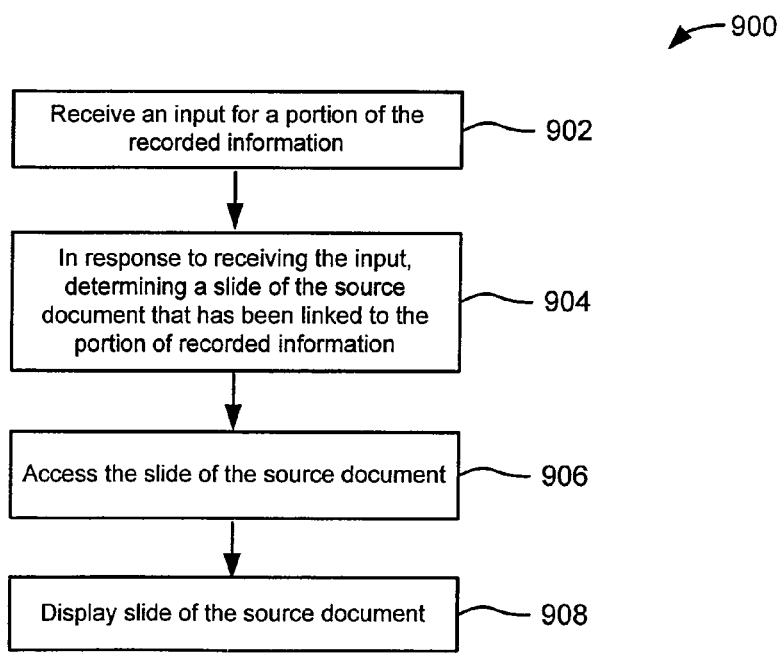
FIG. 9 depicts a flow chart a method for accessing a portions of a source document using portions of an mdoc according to one embodiment of the invention.

FIG. 9 depicts a flow chart 900 a method for accessing a portions of a source document 108 using portions of an mdoc 114 according to one embodiment of the invention. The method depicted in FIG. 9 is merely illustrative of an embodiment incorporating the present invention and does not limit the scope of the invention as recited in the claims. One of ordinary skill in the art would recognize other variations, modifications, and alternatives.

In step 902, an input is received identifying an mdoc 114 and a portion (or index) of mdoc 114. For example, a time T1 for a video of a presentation that was given may be input. In another embodiment, a timeline may be displayed and a certain time T1 on the timeline may be selected. Additionally, an index of different time ranges may also be displayed for selection by a user.

In step 904, in response to receiving the input, a portion of source document 108 is determined. Based upon the received information, a table (such as table 500 depicted in FIG. 4A) can be searched to determine the portion of mdoc 114 was recorded while the slide was being displayed in a presentation. In searching table 500 it is determined if column 504 of table 500 contains an entry that matches the information identifying mdoc 114. If such an entry is found, the rows in column 506 associated with the entry are searched to determine an entry that matches the particular portion of mdoc 114 received in step 902. If such an entry exists, then source documents 108 corresponding to that entry and identified in columns 516 and 520 are the source documents that contain that particular portion. Columns 518 and 522 of table 500 identify the portions (slide numbers, indexes) of source documents 108. The identified portions may be images of the slides.

In step 906, the slides corresponding to the indexes of source document 108 are accessed. In one example, if the portion of mdoc 114 from the time T=5:00 to T=8:00 is input, slide #1 from the location D:\m.ppt is accessed.

In step 908, the slides corresponding to the portion of multimedia information inputted are displayed. In this case, a user may view slides that correspond to the portion of mdoc 114. Although it is described that the slide is displayed, it should be recognized that it may not be displayed but any other action may be performed, such as storing the slide in a different location, opening the slide in an application such as Powerpoint™, sending the slide to a recipient, etc. If the slide is opened in Powerpoint™, then the slide may be edited by a user. The advantage of this is that a user having access to mdoc 114 of the presentation may access the original (or an electronic copy of) source document 108 rather than using a captured image, which would not allow editing in the same way as the original slides of source document 108 allow. This is because captured multimedia documents 114 are often images such as JPEGs and MPEGs that cannot be edited by a Powerpoint™ application while the original slides are in Powerpoint™ format that can be edited using a Powerpoint™ application.

Accordingly, users can use a portion of multimedia information 112 to access the original slides of a source document 108 that were used to give a presentation. Thus, slides may be accessed automatically and any actions may be performed, such as displaying the slide or editing the slide.

In one embodiment, for each slide in a particular source document 108, association information to portions from one or more multimedia documents 114 comprising the slide may be stored in source document 108 for the slide. Various ways of association may be used, e.g., the association information may be stored in an XML file that is associated with the source file. In one embodiment, this does not affect the ability of the file to be opened/edited using the application program that was used to create the source document. Advantages of such a feature are, for example, the file can be shared, copied, etc. Also, the portions of mdocs 114 can be accessed using the application that created slides in a source document 108. For example, a Powerpoint™ application may be used to play back recorded information associated with the slides of a Powerpoint™ document. A user may also access slides in a source document while using an application configured to access portions of mdoc 114. For example, a media player may be used to access a slide in source document 108 while listening to recorded information describing the slide.

Figure 10:
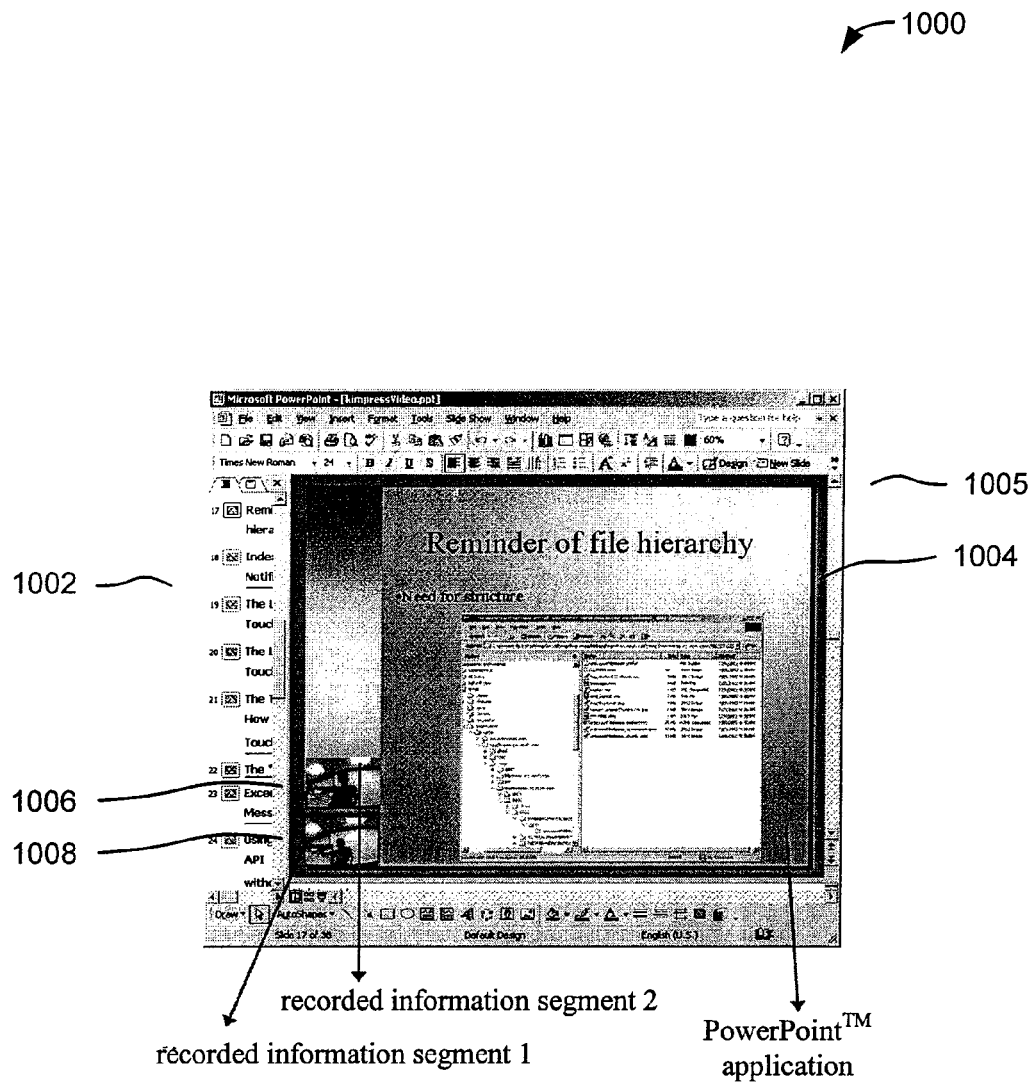
FIG. 10 illustrates a user interface for accessing associated portions of recorded information and portions of a source document according to one embodiment of the present invention.

FIG. 10 illustrates a user interface 1000 for accessing associating portions of recorded information and from a source document 108 according to one embodiment of the present invention. It will be apparent that interface 1000 as depicted in FIG. 10 is merely illustrative of an embodiment incorporating the present invention and does not limit the scope of the invention as recited in the claims. One of ordinary skill in the art will recognize other variations, modifications, and alternatives. As shown in FIG. 10, a PPT source document 108 has been opened using an application program (i.e., Powerpoint™) that was used to create source document 108.

As shown, icons 1002 associated with portions of a source document 108 are displayed along the left-hand side of interface 1000. Also, icons associated with portions of mdocs 114 may also be shown. Icons included can be selected by a user in order to display the slide in source document 108 or access portions of mdoc 114 that correspond to the slide.

A slide 1004 from source document 108 is currently being displayed in window 1005 of interface 1000. Also, portions of mdoc 114 are being displayed in thumbnails 1006 and 1008 (recorded information segment 1 and recorded information segment 2). In one embodiment, thumbnails 1006 and 1008 are static representations, i.e., the recorded information is played only upon selection of 1006 or 1008. The portions have been associated with slide 1004. In one embodiment, as slide 1004 is being displayed, either recorded information segment 1 or recorded information segment 2 is played. A segment of recorded information may be a portion of information (e.g., audio/video information) from a first time to a second time. Also, an input may be received to determine when and whether recorded information segment 1 or 2 may be played. For example, segment 1 may be played followed by segment 2 or a user may select which segment is played.

In one embodiment, recorded information segment 1 and recorded information segment 2 are part of the information that has been captured during a presentation in which the slide from source document 108 depicted in window 1004 was presented or outputted. The information may include an explanation or discussion that was recorded while slide 1004 in source document 108 was displayed. Using interface 1000, a user can view the explanation (e.g., segment 1 and 2) that was provided during the presentation for slide 1004 by accessing slide 1004, etc.

In another embodiment, recorded information segment 1 or recorded information segment 2 may be used to access a slide in source document 1004. For example, segment 1 or segment 2 is selected and a corresponding slide may be displayed. For example, segment 1 may correspond to a first slide and segment two may correspond to a second slide in source document 108. When either of the segments is selected, a corresponding slide is displayed and the recorded information is played.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for storing information for recorded information and a source document, the method comprising:
   determining a first piece of information included in the recorded information, the recorded information including at least audio information recorded during a presentation of a plurality of information sources;
   determining at least a first source document from the plurality of source documents that comprises source information that matches the first piece of information from the recorded information; and
   storing the audio information from the first piece of information in the first source document such that a user is able to access the audio information directly from the first source document.

2. A method according to claim 1, wherein:
   the recorded information further includes visual information, the step of determining at least a first source document that comprises source information that matches the first piece of information including locating a slide in the first source document that matches at least a portion of the visual information in the recorded information.

3. A method according to claim 1, wherein:
   the first source document is generated using a presentation application, the user being able to search for the audio information from the presentation application.

4. A method according to claim 1, further comprising:
   importing the recorded information into the first source document, wherein the user is able to access the audio information from the first piece of information and access the recorded information.

5. A method according to claim 1, further comprising:
   launching an audio player when the user accesses the audio information from the first source document.

6. A method according to claim 1, wherein the first piece of information comprises an image of a slide.

7. A data processing system for storing information for recorded information and a source document, the data processing system comprising:
   a processor; and
   a memory coupled to the processor, the memory configured to store program code for execution by the processor, the program code including:
      code for determining a first piece of information included in the recorded information, the recorded information including at least audio information recorded during a presentation of a plurality of information sources;
      code for determining at least a first source document from the plurality of source documents that comprises source information that matches the first piece of information from the recorded information; and
      code for storing the audio information from the first piece of information in the first source document such that a user is able to access the audio information directly from the first source document.

8. A data processing system according to claim 7, wherein the recorded information further includes visual information, wherein code for determining at least a first source document that comprises source information that matches the first piece of information includes code for locating a slide in the first source document that matches at least a portion of the visual information in the recorded information.

9. A data processing system according to claim 7, wherein:
   the first source document is generated using a presentation application, the user being able to search for the audio information from the presentation application.

10. A data processing system according to claim 7, further comprising:
    code for importing the recorded information into the first source document, wherein the user is able to access the audio information from the first piece of information and access the recorded information.

11. A data processing system according to claim 7, further comprising:
    code for launching an audio player when the user accesses the audio information from the first source document.

12. A data processing system according to claim 7, wherein the first piece of information comprises an image of a slide.

13. A computer program product embedded in a computer-readable medium for storing information for recorded information and a source document, the computer program product comprising:
    code for determining a first piece of information included in the recorded information, the recorded information including at least audio information recorded during a presentation of a plurality of information sources;
    code for determining at least a first source document from the plurality of source documents that comprises source information that matches the first piece of information from the recorded information; and code for storing the audio information from the first piece of information in the first source document such that a user is able to access the audio information directly from the first source document.

14. A computer program product according to claim 13, wherein the recorded information further includes visual information, wherein code for determining at least a first source document that comprises source information that matches the first piece of information includes code for locating a slide in the first source document that matches at least a portion of the visual information in the recorded information.

15. A computer program product according to claim 13, wherein:

the first source document is generated using a presentation application, the user being able to search for the audio information from the presentation application.

16. A computer program product according to claim 13, further comprising:

code for importing the recorded information into the first source document, wherein the user is able to access the audio information from the first piece of information and access the recorded information.

17. A computer program product according to claim 13, further comprising:

code for launching an audio player when the user accesses the audio information from the first source document.

18. A computer program product according to claim 13, wherein the first piece of information comprises an image of a slide.

* * * * *